United States Patent [19]

Ochiai

[11] Patent Number: 5,163,042
[45] Date of Patent: * Nov. 10, 1992

[54] EXCHANGE ROUTE DECISION SYSTEM AND METHOD

[75] Inventor: Tamiya Ochiai, Hachioji, Japan

[73] Assignee: Kabushiki Kaisha Toshiba, Kawasaki, Japan

[*] Notice: The portion of the term of this patent subsequent to Aug. 6, 2008 has been disclaimed.

[21] Appl. No.: 439,674

[22] Filed: Nov. 22, 1989

[30] Foreign Application Priority Data

Nov. 24, 1988 [JP] Japan .................................. 63-296830

[51] Int. Cl.⁵ ................................................ H04J 3/22
[52] U.S. Cl. ........................................ 370/17; 370/54; 379/220
[58] Field of Search ......................... 370/13, 17, 54, 84, 370/58.1, 16, 58.2, 58.3, 60, 94.1; 379/219, 220, 221

[56] References Cited

U.S. PATENT DOCUMENTS

| 4,905,233 | 2/1990 | Cain et al. ............................. | 370/17 |
| 5,038,340 | 8/1991 | Ochiai .................................. | 370/17 |

Primary Examiner—Benedict V. Safourek
Assistant Examiner—Dang Ton
Attorney, Agent, or Firm—Finnegan, Henderson, Farabow, Garrett and Dunner

[57] ABSTRACT

An exchange route decision system and method which, when it is desired to realize tandem connection between outgoing and incoming communication terminals of various sorts and multiple rates requiring immediate data communication through a plurality of exchanges, take the residual capacities of relay lines between the outgoing and incoming terminals into consideration. In the system and method, the residual capacities of the relay lines between the outgoing and incoming terminals are divided into a plurality of classes based on predetermined line capacity units, data on routes providing minimum costs in association with the classes are controlled. Boundary values of each of the classes are separately controlled at residual-line-capacity increasing and decreasing sides. Updating operation of the route data in association with the classes takes place only when a change in the residual line capacity exceeds the capacity increasing or decreasing boundary value of the class.

20 Claims, 17 Drawing Sheets

| INCOMING EXCHANGE | RESIDUAL CAPACITY CLASS NUMBER | MINIMUM COST | MINIMUM COST LINE NUMBER |
|---|---|---|---|
| | | | TBMCC |
| $N_j$ | 1 | $C_{Nj, C1}$ | $L_{X1}$ |
| | 2 | $C_{Nj, C2}$ | $L_{X2}$ |
| | 3 | $C_{Nj, C3}$ | $L_{X3}$ |
| | 4 | $C_{Nj, C4}$ | $L_{X4}$ |
| | 5 | $C_{Nj, C5}$ | $L_{X5}$ |
| | ⋮ | ⋮ | ⋮ |
| ⋮ | ⋮ | ⋮ | ⋮ |

FIG. 6

| CLASS NUMBER | RESIDUAL LINE CAPACITY RANGE | MEANING | DECREASING-DIRECTIONAL CLASS BOUNDARY VALVE | INCREASING-DIRECTIONAL CLASS BOUNDARY VALVE |
|---|---|---|---|---|
| 1 | 0 ≤ Q ≤ B1 LOWER LIMIT | UNREGISTRABLE | | B1 UPPER LIMIT |
| 2 | B1 UPPER LIMIT ≤ Q ≤ B2 LOWER LIMIT | REQUESTABLE FOR TERMINALS LESS THAN B1 LOWER LIMIT | B1 LOWER LIMIT | B2 UPPER LIMIT |
| 3 | B2 UPPER LIMIT ≤ Q ≤ B3 LOWER LIMIT | REQUESTABLE FOR TERMINALS LESS THAN B2 LOWER LIMIT | B2 LOWER LIMIT | B3 UPPER LIMIT |
| 4 | B3 UPPER LIMIT ≤ Q ≤ B4 LOWER LIMIT | REQUESTABLE FOR TERMINALS LESS THAN B3 LOWER LIMIT | B3 LOWER LIMIT | B4 UPPER LIMIT |
| 5 | B4 UPPER LIMIT ≤ Q ≤ B5 LOWER LIMIT | REQUESTABLE FOR TERMINALS LESS THAN B4 LOWER LIMIT | B4 LOWER LIMIT | |
| ----- | ----- | ----- | ----- | ----- |

FIG. 7

| INCOMING EXCHANGE | RESIDUAL LINE CAPACITY CLASS NUMBER | MINIMUM COST VALUE |
|---|---|---|
|  |  |  |
| $N_j$ | 1 | $C_{Nj,Li,C1}$ |
|  | 2 | $C_{Nj,Li,C2}$ |
|  | 3 | $C_{Nj,Li,C3}$ |
|  | 4 | $C_{Nj,Li,C4}$ |
|  | 5 | $C_{Nj,Li,C5}$ |
|  | ⋮ | ⋮ |
| ⋮ | ⋮ | ⋮ |

FIG.11

TBMCL

| INCOMING EXCHANGE | RESIDUAL CAPACITY CLASS NUMBER | LINE L1 | ---- | LINE Li | ---- | LINE LL |
|---|---|---|---|---|---|---|
|  |  |  |  |  |  |  |
| $N_j$ | 1 | $C_{Nj,L1,C1}$ |  | $C_{Nj,Li,C1}$ |  | $C_{Nj,LL,C1}$ |
|  | 2 | $C_{Nj,L1,C2}$ |  | $C_{Nj,Li,C2}$ |  | $C_{Nj,LL,C2}$ |
|  | 3 | $C_{Nj,L1,C3}$ |  | $C_{Nj,Li,C3}$ |  | $C_{Nj,LL,C3}$ |
|  | 4 | $C_{Nj,L1,C4}$ |  | $C_{Nj,Li,C4}$ |  | $C_{Nj,LL,C4}$ |
|  | 5 | $C_{Nj,L1,C5}$ |  | $C_{Nj,Li,C5}$ |  | $C_{Nj,LL,C5}$ |
|  | ⋮ | ⋮ |  | ⋮ |  | ⋮ |
| ⋮ |  |  |  |  |  |  |

FIG.12

| INCOMING EXCHANGE | RESIDUAL CAPACITY CLASS NUMBER | MINIMUM COST VALUE |
|---|---|---|
| ⋮ | ⋮ | ⋮ |
| $N_j$ | 1 | $C_{Nj, C1}$ + LINE $L_K$ LOAD VALUE |
|  | 2 | $C_{Nj, C2}$ + LINE $L_K$ LOAD VALUE |
|  | 3 | $C_{Nj, C3}$ + LINE $L_K$ LOAD VALUE |
|  | 4 | $C_{Nj, C4}$ + LINE $L_K$ LOAD VALUE |
|  | 5 | $C_{Nj, C5}$ + LINE $L_K$ LOAD VALUE |
| ⋮ | ⋮ | ⋮ |
| ⋮ | ⋮ | ⋮ |

$TBMCL_K$

FIG.13

| INCOMING EXCHANGE | REQUEST SPEED CLASS NUMBER | MINIMUM COST | MINIMUM COST LINE NUMBER |
|---|---|---|---|
| | --- | --- | --- |
| NJ | 1 | CNj,C1 | Lx1 |
| | 2 | CNj,C2 | Lx2 |
| | 3 | CNj,C3 | Lx3 |
| | 4 | CNj,C4 | Lx4 |
| | 5 | CNj,C5 | Lx5 |
| | --- | --- | --- |
| | --- | --- | --- |

TBMCC2

FIG.14

| INCOMING EXCHANGE | INCOMING TERMINAL | ALLOWABLE COST RANGE(COST) | ALLOWABLE SPEED RANGE(TX) | COST/TX PRIORITY FLAG |
|---|---|---|---|---|
| 1 | | | | COST PRIORITY |
| Nj | M1 | C10 — C11 | T10 — T11 | TX PRIORITY |
| | M2 | C20 — C21 | T20 — T21 | |
| | M3 | C30 — C31 | | |
| | M4 | C40 — C41 | | |
| | ⋮ | ⋮ | ⋮ | ⋮ |
| | Mm | Cmo — Cm1 | Tmo — Tm1 | COST PRIORITY |
| | | | | |

EXCHANGE ROUTE DECISION SYSTEM AND METHOD

BACKGROUN OF THE INVENTION

1. Field of the Invention

The present invention relates to exchange route decision system and a method of communicating in networks wherein tandem connection is carried out between various types of multiple speed communication terminals through a plurality of exchanges to realize immediate information communication between the terminals.

2. Description of the Prior Art

FIG. 1 shows an example of a prior art exchange route decision method in the case where tandem connection is carried out between communication terminals through a plurality of exchanges. In the drawing, tandem connection between an outgoing terminal 10 and an incoming terminal 11 is realized by selecting either one of two routes, i.e., exchange 12→line 20→exchange 13→line 21→exchange 14→line 22→exchange 15→incoming terminal 11; or exchange 12→line 20→exchange 13→line 23→exchange 16→line 24→exchange 15→incoming terminal 11.

The exchanges 12 to 16, which form a relay route for transmission of communication data include connection type packet exchanges, connection type line exchanges, connection type asynchronous transfer mode exchanges and the like exchanges.

Prior to establishing the tandem connection between the outgoing and incoming terminals 10 and 11, the exchanges 12 to 16 determines one of the routes which is minimum in the cost $C_j$ of the routes in a manner to be discussed below. The cost $C_j$ is expressed in terms of an estimated value of the route from the outgoing exchange 12 to the incoming exchange 15, and defined, for example, as the following equation.

$$C_j = \Sigma(\alpha + \beta D_{Li}) \quad (1)$$

where Li represents the number of a line making up a route between the exchanges, $D_{Li}$ represents a distance between the exchanges, $\alpha$ represents the processing load cost of a relay exchange, and $\beta$ represents a cost coefficient relating to line distance. The value $(\alpha + \beta D_{Li})$ indicates the load of the line and when the line is abnormal, the value is expressed in terms of $\infty$.

Each of the exchanges 12, 13, 14 and 16 calculates the costs $C_j$ of a plurality of routes from each of the exchanges to the incoming terminal 11. A minimum $C_{Nj}$ of the costs $C_j$ thus calculated as well as information on the number $L_x$ of starting one of the lines contributing to the minimum cost $C_{Nj}$ are held in a minimum cost table TBMC with respect to the different exchanges, as shown in FIG. 2. For example, assume that, in the example of FIG. 1, the lines 20, 21, 22, 23 and 24 have loads of 15, 15, 5, 25 and 10, respectively. Then the contents of the minimum cost tables TBMC for the respective exchanges 12 to 14 and 16 are as shown in FIG. 1. More specifically, when attention is directed to the exchange 13 which corresponds to a branch point of the two routes from the outgoing terminal 10 to the incoming terminal 11, the exchange 13 selects the line 21 having the line number $L_x$ of L2 as a minimum cost line.

In the example of FIG. 1, accordingly, the route of the exchange 12→the exchange 13→the exchange 14→the exchange 15 is selected for the tandem connection between the outgoing and incoming terminals 10 and 11.

Such a route deciding procedure is shown in FIG. 3 in the form of a flowchart. In detail, when the outgoing terminal issues a calling request, the present system retrieves the minimum cost line number $L_x$ relating to the incoming exchange from the minimum cost table TBMC (step 30). Thereafter, the system determines whether or not the line capacity requested by the outgoing terminal remains in the line corresponding to the retrieved line number $L_x$ (step 31). If not, then the system processes it as a call loss.

When the line capacity remains in the line corresponding to the retrieved line number Lx, the system determines that the line of the retrieved line number $L_x$ is the minimum cost line (step 32) and calls the adjacent exchange which is connected to the downstream end of the $L_x$ line in question (step 33).

Here, assuming in the above route deciding procedure that the outgoing terminal 10 requests a line capacity q of 2 and the lines 20 to 24 have residual capacities Q (which can be used by the lines 20 to 24) of 4, 5, 1, 4 and 6, respectively, then the route extended from the exchange 12 to the exchange 14 can be used for tandem connection since the request capacity q of the outgoing terminal 10 is larger than any of the residual capacities Q of the lines 20 and 21. With respect to the route from the exchange 14 to the exchange 15, however, the residual capacity Q of the line 22 is smaller than the request capacity q and thus tandem connection is broken at the stage when the system calls the exchange 14, as shown by an arrow 25 in FIG. 1, whereby the system processes it as a call loss.

In this way, the prior art route decision method suffers from a problem that, since the prior art selects one of the routes from the outgoing terminal to the incoming terminal on the basis of only the minimum cost information, there is a possibility that the prior art may select a route that does not satisfy the request line capacity of the outgoing terminal, thus involving a call loss.

SUMMARY OF THE INVENTION

It is an object of the present invention to provide an exchange route decision system and method which can select one of routes which is minimum in cost without causing any call loss, whereby tandem connection can be realized between outgoing and incoming terminals.

It is another object of the present invention to provide an exchange route decision system and method which can minimize the number of updating operations for route data classified according to the residual line classes and thus can alleviate the burden imposed on respective exchanges.

It is yet a further object of the present invention to provide an exchange route decision system and method which can satisfy both allowable cost and allowable communication speed.

In accordance with an aspect of the present invention, the above objects are attained by dividing residual capacities of respective relay lines into a plurality of classes according to predetermined capacity units, controlling minimum cost route data in association with the classes, separately controlling boundary values of each of the classes at residual-line-capacity increasing and decreasing sides, and performing the tandem connection between the outgoing and incoming terminals. When there is a new line interconnection request, the system selects one of the routes corresponding to the class satisfying the line capacity of the line interconnection request. Accordingly, if any one of the plurality of routes connected between the outgoing and incoming terminals satisfies the request line capacity of the outgoing terminal, then tandem connection between the outgoing and incoming terminals is established through the satisfied route, so that the call loss will be removed except for the case where there remains in all the routes no lines which satisfy the request line capacity of the outgoing terminal.

Even when a change takes place in the residual line capacity, the updating operation of the route data according to the class will not occur as long as such change does not exceed the boundary value of the each class at line-capacity increasing or decreasing side, which results in that the burden imposed on the respective exchanges for control of the route data can be reduced.

In accordance with another aspect of the present invention, communication speeds of the relay lines are divided into a plurality of communication speed classes, minimum cost route data are controlled according to the classes, and one of the routes satisfying the allowable cost and the allowable communication speed.

In this way, in the present invention, since the residual line capacities are controlled according to the classes and the boundary values of each of the classes are separately set at the residual-line-capacity increasing and decreasing sides, one of the routes providing the minimum cost can be selected without causing any call loss, the number of updating operation of the route data according to the residual line capacity classes can be reduced, and the burden of the respective exchanges can be lightened.

When the system is arranged to select one of the routes satisfying the allowable cost and the allowable communication speed, it can be prevented that the communication cost is increased and exceeds a desirable level depending on the load condition of the each exchange, and thus economic communication can be realized.

BRIEF DESCRIPTION OF THE DRAWINGS

FIG. 6 shows the structure of a minimum cost table by remaining line capacity classes;

FIG. 7 shows organization criteria for the residual line capacity classes;

FIG. 11 shows the contents of minimum cost vectors for input line residual capacity control;

FIG. 12 shows the structure and contents of a minimum cost table by lines;

FIG. 13 shows the structure and contents of a minimum; and cost vector for output line residual capacity control;

FIG. 14 shows contents of a minimum cost table with respect to communication speeds;

DESCRIPTION OF THE PREFERRED EMBODIMENT

Figure 1:
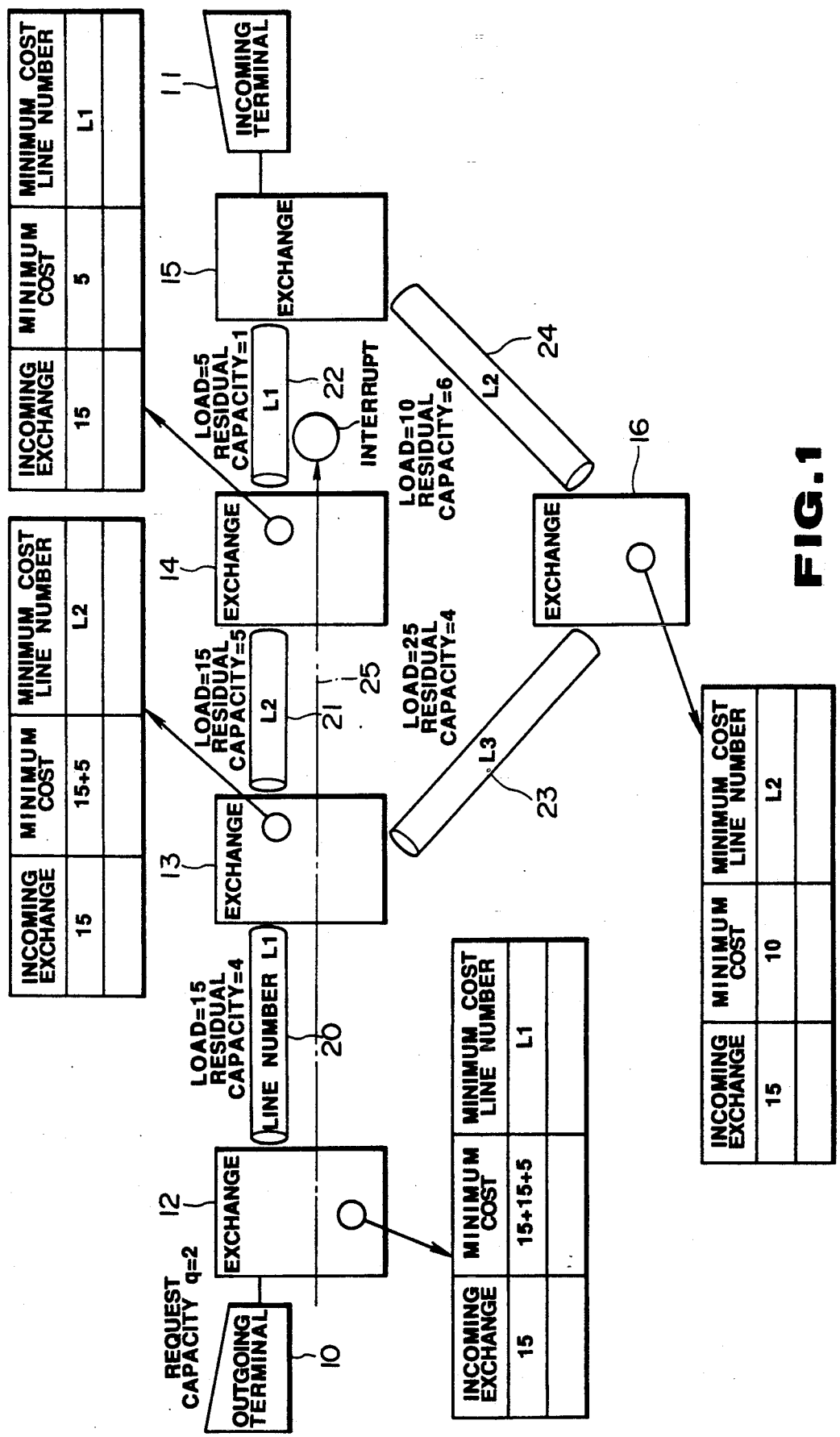
FIG. 1 shows an example of an exchange system for explaining a prior art route decision method.
Figures 2, 3:
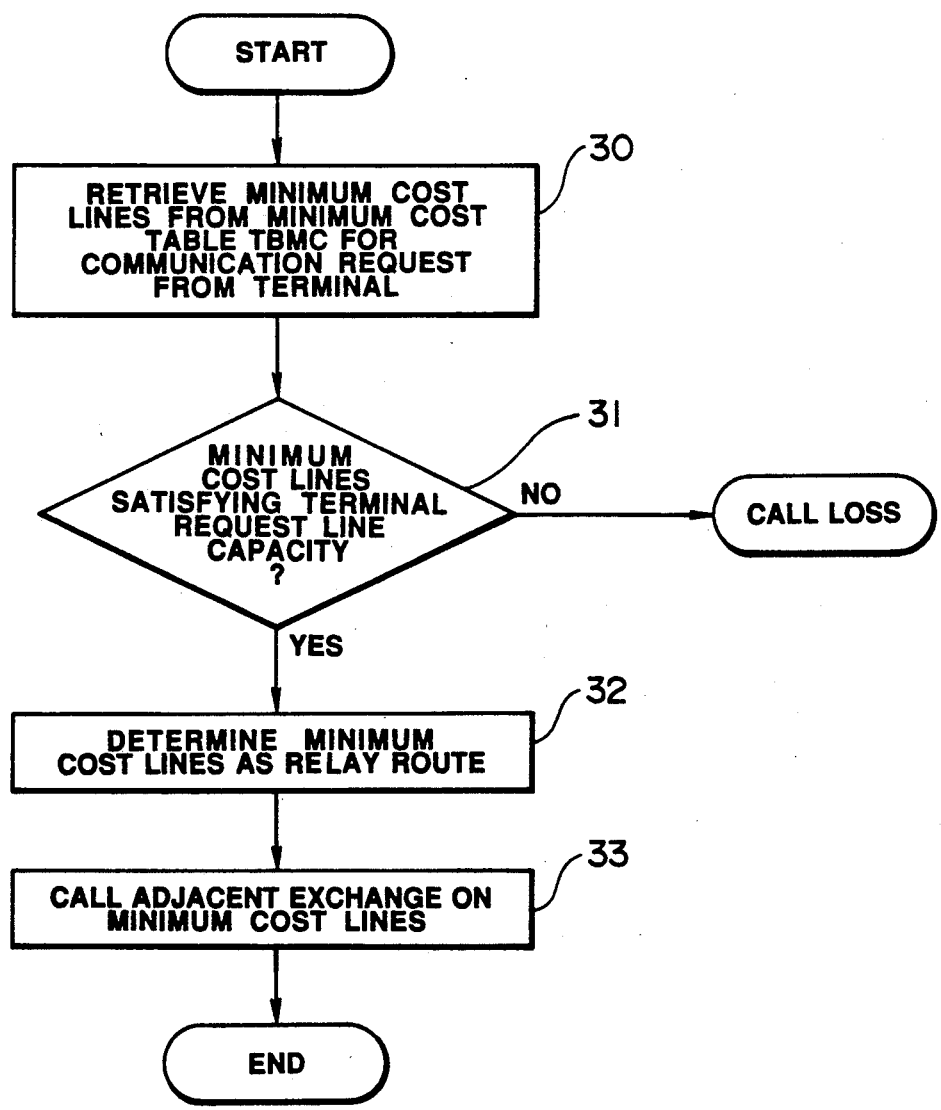
FIG. 2 shows the structure and contents of a minimum cost table used in the prior art route decision method.
FIG. 3 is a flowchart showing a prior art route decision procedure.
Figure 4:
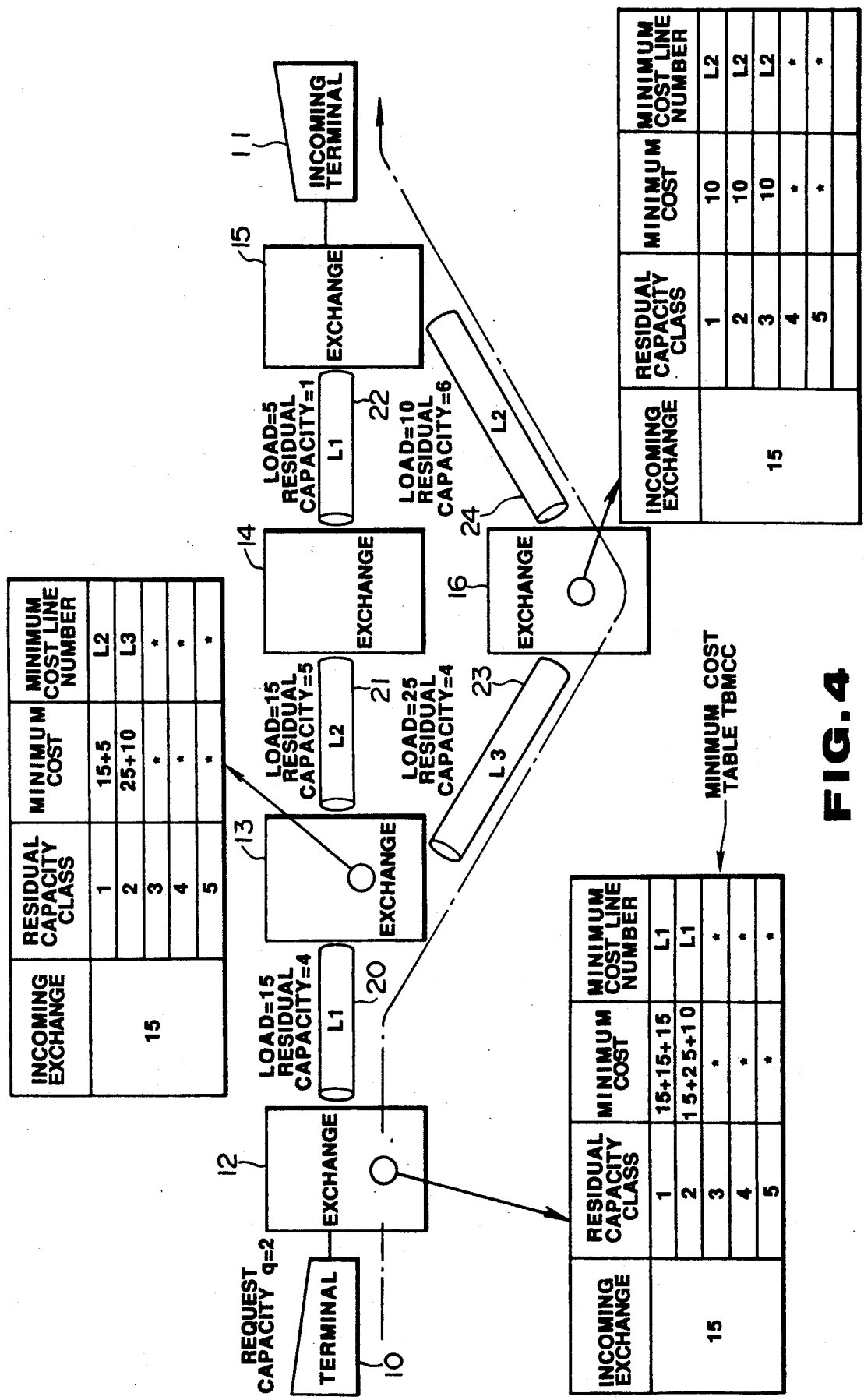
FIG. 4 shows an embodiment of an exchange system for explaining a route decision method in accordance with the present invention.

Referring to FIG. 4, there is shown an embodiment of a route decision method in accordance with the present invention, in which, as in the case of FIG. 1, tandem connection is realized between outgoing and incoming terminals 10 and 11 by selecting either one of two routes, that is, exchange 12→line 20→exchange 13→line 21→exchange 14→line 22→exchange 15→incoming terminal 11; or exchange 12→line 20→exchange 13→line 23→exchange 16→line 24→exchange 15→incoming terminal 11.

Figure 5:
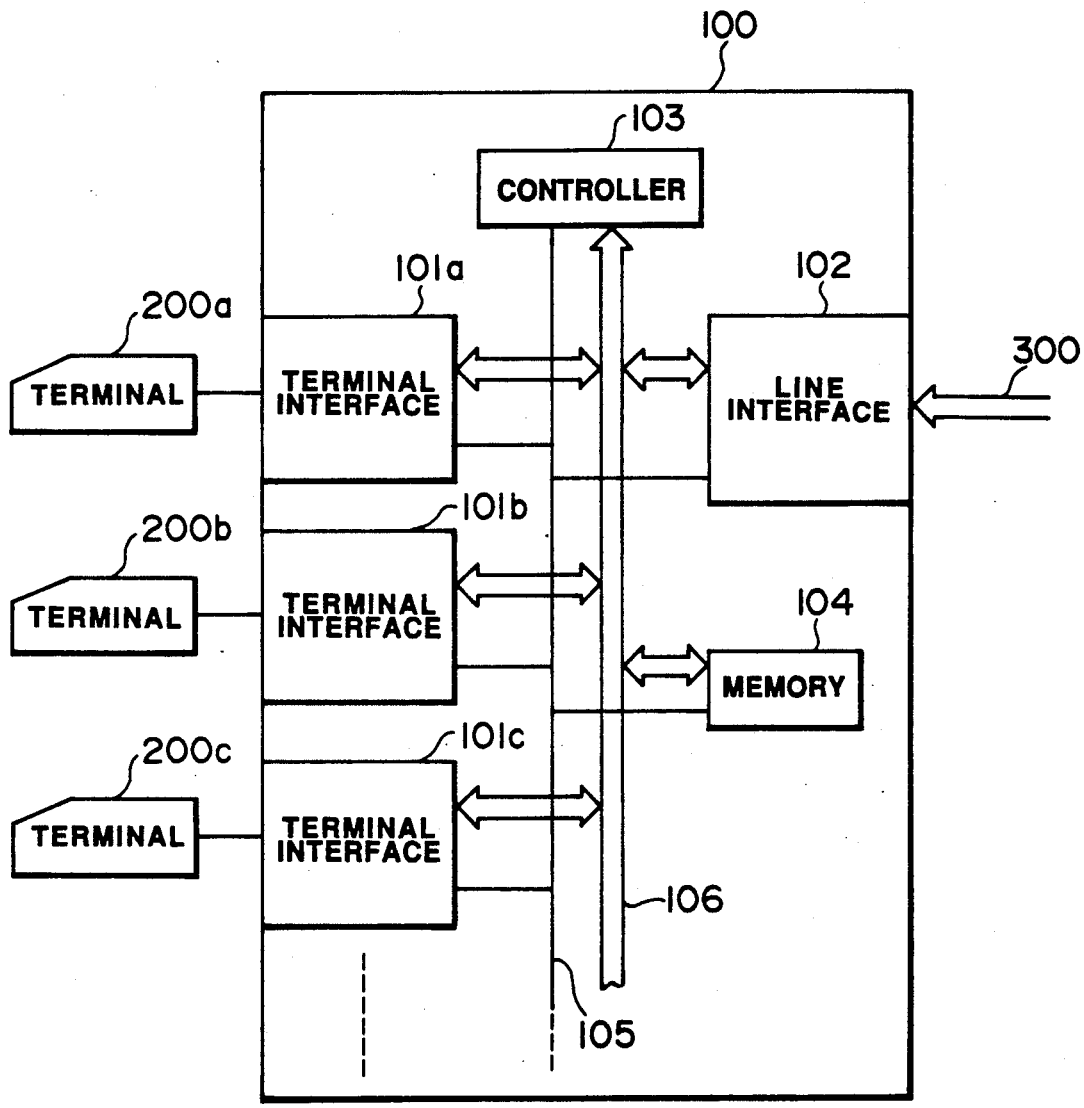
FIG. 5 is a block diagram of an example of an exchanged used in the present invention.

The exchanges 12 to 16, which form a relay route for transmission of communication data, include connection type packet exchanges, connection type line exchanges, connection type asynchronous transfer mode exchanges and the like exchanges. The schematic arrangement of a connection type packet exchange as an example is shown by a block diagram in FIG. 5. In FIG. 5, a connection type packet exchange 100 includes terminal interfaces 101a to 101c connected to terminal apparatuses 200a to 200c respectively, a line interface 102 connected to a line 300, a controller 103 for controlling the entire exchange 100, and a memory 104 for storing therein various control data in the controller 103. The terminal interfaces 101a to 101c, line interface 102 and memory 104 are connected to the controller 103 by a control bus 105 and a data bus 106.

Each of the exchanges 12 to 16 in this embodiment of FIG. 4 has a minimum cost table TBMCC of the type shown in FIG. 6, in which residual line capacities are divided into a plurality of classes according to predetermined capacity units and line numbers $L_x$ corresponding to the minimum cost up to the incoming exchange (exchange 15) with respect to the different classes are stored. The system decides one of the routes from the outgoing terminal 10 to the incoming terminal 11 by referring to the table TBMCC. With the arrangement of FIG. 5, the minimum cost table TBMCC is provided in the memory 104. In FIG. 6, reference symbol Nj denotes the number of an incoming exchange, $[C_{Nj}, C_m]$ such as $[C_{Nj}C1]$ or $[C_{Nj}C2]$ denotes the minimum; and cost of lines in the tandem connection directed to the incoming exchange $N_j$ according to the residual line capacity class $C_m$, and $L_{xm}$ such as $L_{x1}$ or $L_{x2}$ denotes a minimum-cost line number for the residual line capacity class $C_m$.

Figure 8:
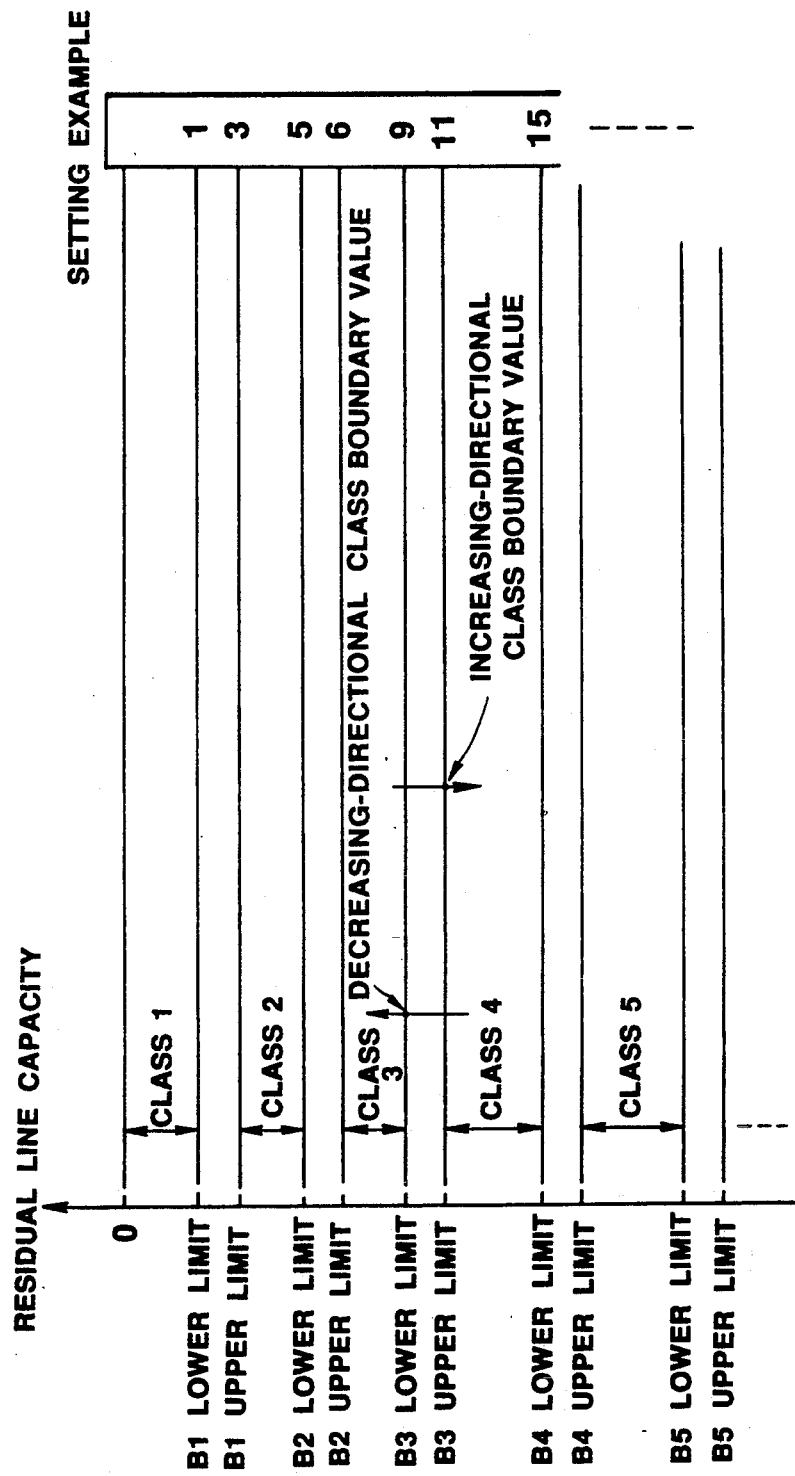
FIG. 8 shows a particular example of the organization criterions for the residual line capacity classes.

As shown in FIG. 7, the residual line capacity classes $C_m$ are expressed in terms of such line capacity ranges as $0 \leq Q < B_1$ lower limit, $B_1$ upper limit $\leq 0 < B_2$ lower limit, $B_2$ upper limit $\leq 0 < B_3$ lower limit ..., in which the line capacity Q is classified into ranges having a plurality of limits or stages corresponding to predetermined capacity units (such as O, $B_1$, $B_2$, $B_3$, ...); while, as shown in FIG. 8, the boundaries of each of the classes are controlled by the upper limit of the class a·the residual-line-capacity increasing side and by the lower limit at the residual-line-capacity decreasing side. For example, class 1 corresponding to $C_m=1$ indicates that tandem connection can be realized for the line request capacity q less than the capacity $B_1$.

Assume now that the residual line capacity classes $C_m$ are divided as shown in FIG. 8, the lines 20 to 24 have loads, 15, 15, 5, 25 and 10 respectively as in the example of FIG. 1. Assume further that the request line capacity q of the outgoing terminal 10 is 2 and the lines 20 to 24 have residual capacities Q of 4, 5, 1, 4 and 6 respectively. With respect to the exchange 12, since the residual line capacity Q is "4", the residual line capacity is divided into classes 1 to 3 as shown by a minimum cost table TBMCC in FIG. 4. For class 1, the minimum cost is "15+15+5" and the minimum cost line number $L_{x1}$ is $L_1$ corresponding to the line number of the line 20 in the minimum cost table. Similarly, for class 2, the minimum cost is "15+25+10" and the minimum cost line number $L_{x9}$ is $L_1$ corresponding to the line number of the line 20; for class 3, the minimum cost is "15+25+10" and the minimum cost line number $L_{x9}$ is $L_1$ corresponding to the line number of the line 20.

With respect to the exchange 13, the minimum cost is "15+5" and the minimum cost line number $L_{x1}$ is $L_2$ corresponding to the line number of the line 21 for class 1; the minimum cost is "25+10" and the minimum cost line number $L_{x2}$ is $L_3$ corresponding to the line number of the line 23 for class 2; and the minimum cost is "25+10" and the minimum cost line number $L_{x3}$ is $L_3$ corresponding to the line number of the line 23 for class 3.

With respect to the exchange 16, the minimum cost is "10" and the minimum cost line number $L_x$ is $L_2$ corresponding to the line number of the line 24, for all classes 1 to 3.

With respect to the exchange 14, since the residual line capacity Q is 1, the minimum cost is "5" and the minimum cost line number $L_{x1}$ is $L_1$ corresponding to the line 22 only for class 1.

Figure 9:
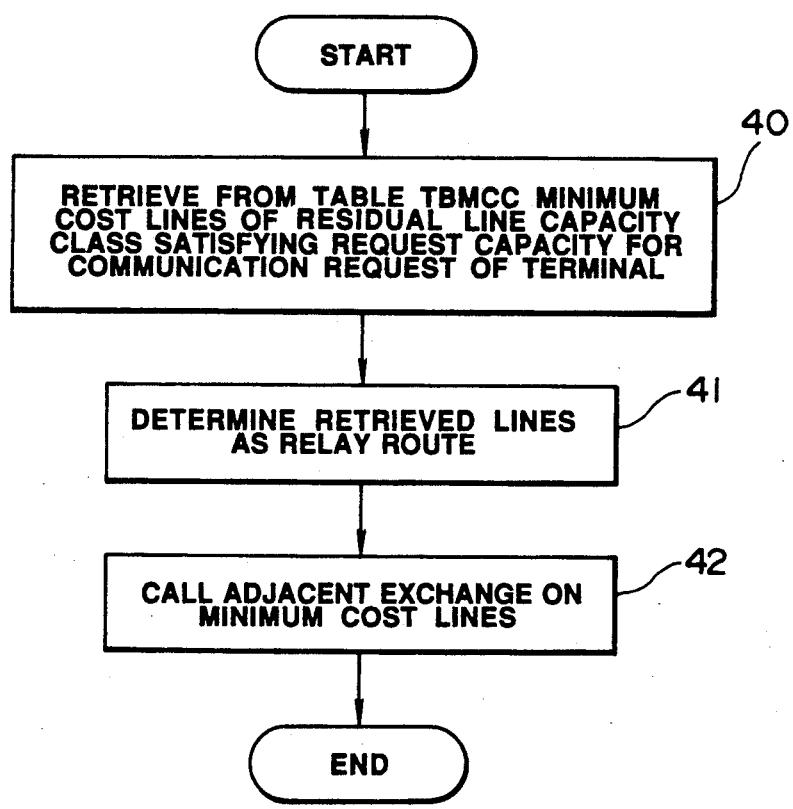
FIG. 9 is a flowchart showing a route decision procedure in accordance with the present invention.

Under such conditions, when the outgoing terminal 10 issues a calling request having a line request capacity q of 2 each of the exchanges 12 to 16 retrieves the; and associated minimum cost table TBMCC classified according to the residual line capacity classes and extract the minimum cost line numbers $L_x$ for the class satisfying the line request capacity q (step 40), as shown by a route decision procedure flowchart in FIG. 9. Then, the system decides the extracted minimum cost line number $L_x$ as a minimum cost route leading to the incoming terminal 11 (step 41) and sends the calling request to the adjacent exchange connected to the downstream end of the line of the decided minimum cost line number $L_x$ (step 42). The adjacent exchange, when receiving the calling request, decides a minimum cost route leading to the incoming terminal 11 in the same manner as for the first exchange.

In detail, the exchange 12, since the line request capacity q is 2, selects the line number $L_1$ (line 20) for class 2 satisfying the condition q=2. Next, the exchange 13 selects the line number $L_3$ (line 23) for class 2 satisfying the condition q=2. The exchange 16 then selects the line number $L_2$ (line 24) for class 2. As a result, the outgoing terminal 10 is connected with the incoming terminal 11 by the route of exchange 12→line 20→exchange 13→line 23→exchange 16→line 24→exchange 15.

As a result, any call loss will not take place except for the case where any route satisfying the request line capacity condition is not left at all.

In order to realize such route decision procedure as mentioned above, each of the exchanges must confirms the associated residual line capacity and prepare such a minimum cost table TMBCC classified according to the residual line capacity class as shown in FIG. 6.

Preparation of the table TBMCC will now be explained.

Figure 10:
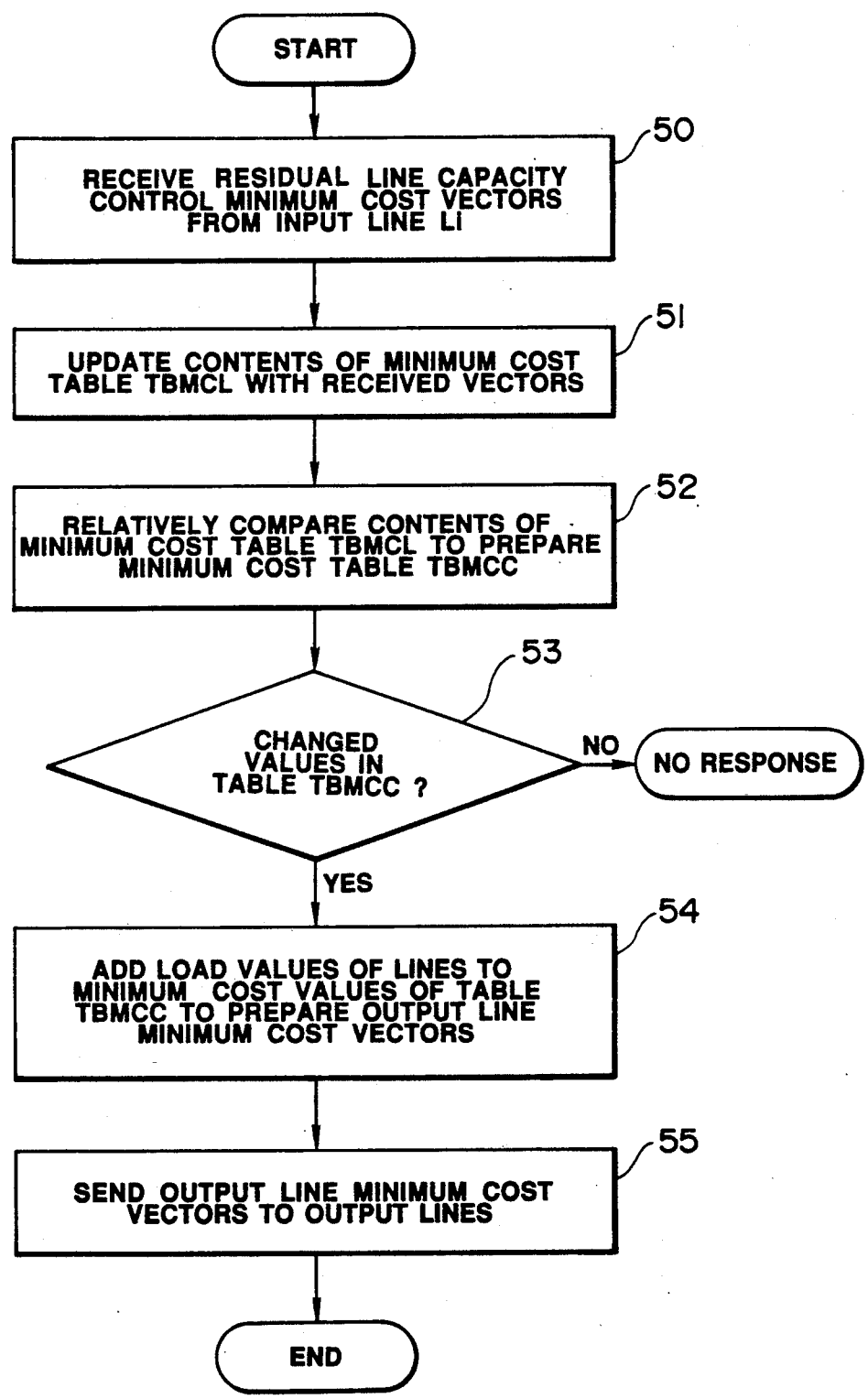
FIG. 10 is a flowchart showing a procedure of preparing the minimum cost table by residual line capacity classes.

Shown in FIG. 10 is a flowchart explaining a procedure of preparing the table TBMCC. The table preparing procedure is executed when a trouble takes place in the line and the cost of the line becomes infinity and when the residual line capacity Q varies around a boundary of the residual line capacity class $C_m$. If the exchange receives such minimum cost values $C_{Nj, Li, Cm}$ classified according to the residual capacity classes of the lines leading to the incoming exchange $N_j$ as shown in FIG. 11 (step 50), as minimum cost vectors for input-line residual capacity control, the exchange updates to the then received minimum cost values $C_{Nj, Li, Cm}$ the minimum cost values of input line $L_i$ in an every-line minimum cost table TBMCL (listing the minimum costs for all the lines leading to the incoming exchange $N_j$) according to the residual line capacity class, as shown in FIG. 12 (step 51). Then the exchange compares the minimum cost values in the row direction in the table TBMCL, extracts the line number $L_x$ enabling the realization of minimum cost relay with respect to the incoming exchange $N_j$ as well as the corresponding minimum cost values, and prepares such a minimum cost table TBMCC classified according to the residual line capacity class as shown in FIG. 6 (step 52).

Thereafter, when the contents of the minimum cost table TBMCC classified according to the residual line capacity class is changed, the exchange adds the current load values of the respective line numbers $L_k$ to the minimum cost values of all the line numbers $L_k$ except for the input line $L_i$ respectively, and prepares such a table $TBMCL_k$ for output line residual capacity minimum cost vector as shown in FIG. 13 (steps 53 and 54). When the contents of the table TBMCC have not been changed but data exchange timing is made at a regular period, the step 54 is executed. In the case of the regular-period data exchange timing, the exchange adds the current load values of all the line numbers including the input line number $L_i$ to the minimum cost values of the line numbers $L_k$.

Then, the exchange transmits the contents of the table $TBMCL_k$ of FIG. 13 to the associated output line numbers $L_k$ (step 55). As a result, the system can discriminate the minimum cost values classified according to the residual line capacity class at the mutually adjacent exchanges, and can dynamically judge on the basis of the discimination and select one of routes up to the incoming terminal providing the minimum cost while following load variations in the exchanges.

In this way, in the present embodiment, minimum cost routes are classified according to the residual line capacities and routes corresponding to classes satisfying the request line capacity of the outgoing terminal are sequentially selected. As a result, perfectly no call loss takes place in conditions other than the highly restricted conditions and interconnection between the outgoing and incoming terminals can be reliably achieved through a minimum cost route. Therefore, when the present system is applied in deciding one of the routes of exchanges connected with terminals which handle voice data demanding immediateness and various sorts of transmission speeds, the system can exhibit its excellent effects. Further, since the boundary values of the each residual line capacity class are separately set at the residual-line-capacity decreasing and increasing sides, the creating operation of the minimum cost table TBMCC will not frequently occur, even when the residual line capacity class is changed and the residual line capacity varies around the boundary value. In detail, when a call setting causes the residual line capacity Q to become smaller than the lower limit value of the class $C_m$ and also causes the residual line capacity class $C_m$ to be shifted to $C_{m-1}$, the creating operation of the minimum cost table TBMCC will not take place until the capacity is restored to the residual line capacity corresponding to the upper limit value of the class $C_{m-1}$. This, decreases the burden imposed on the each exchange.

The residual line capacity has been used as the minimum cost controlling reference in the foregoing embodiment. In the case where the communication speed demanded by the outgoing terminal in place of the residual line capacity is used as the minimum cost control reference, when minimum cost values $[CN_j, C_m]$ and line numbers $L_{xm}$ according to communication speeds leading to an incoming exchange $N_j$ are previously set as the contents of such a minimum cost table TBMCC2 as shown in FIG. 14, one of the routes providing the minimum cost can be selected at the request communication speed of the outgoing terminal through substantially the same procedure as in FIG. 9.

Figure 15:
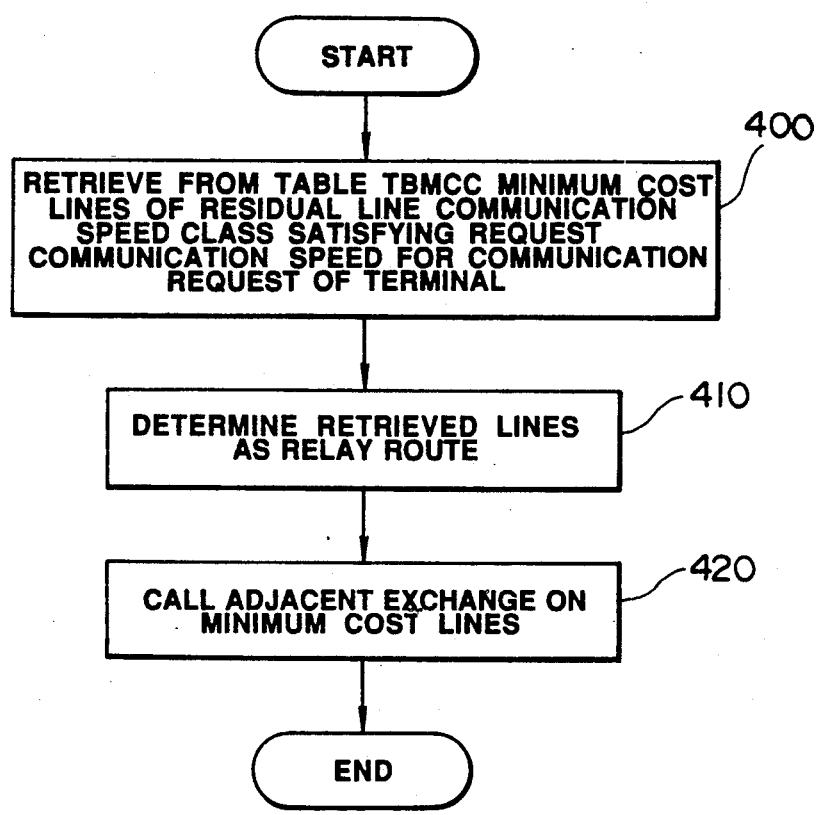
FIG. 15 is a flowchart for explaining a route decision procedure when the minimum cost table of FIG. 14 with respect to the communication speeds is used.

Shown in FIG. 15 is a flowchart for explaining the route decision procedure when such a minimum cost table with respect to different communication speeds as shown in FIG. 14 is employed. As shown in the route decision procedure of the flowchart of FIG. 15, the system, at the respective exchanges 12 to 16, retrieves the minimum cost table TBMCC2 according to the different line communication speed classes, and extracts the minimum cost line number $L_x$ corresponding to the class satisfying the request communication speed (step 400). Then the system decides the minimum cost line number $L_x$ as the route leading to the incoming terminal 11 and providing the minimum cost (step 410), and transmits a calling request to the adjacent exchange connected to the downstream end of the line number $L_x$ (step 420). The exchange, when receiving the calling request, similarly decides one of the routes leading to the incoming terminal 11.

Since only the communication speed is used as the route selection reference, however, there may occur such a situation that the selected route cannot satisfy the allowable cost of the outgoing terminal depending on the load conditions of the exchanges, thus involving the inevitable communication with a cost higher than the preset level.

Referring to FIGS. 16 to 20, there is shown an arrangement of a system in accordance with another embodiment of the present invention, which is intended to solve such circumstances, and wherein, as in the case of FIG. 4, tandem connection between the outgoing terminal 10 and the incoming terminal 11 is established by selecting one of two routes, i.e., exchange 12→line 20→exchange 13→line 21→exchange 14→line 22→exchange 15→incoming terminal 11, and exchange 12→line 20→exchange 13→line 23→exchange 16→line 24→exchange 15→incoming terminal 11.

Figure 17:
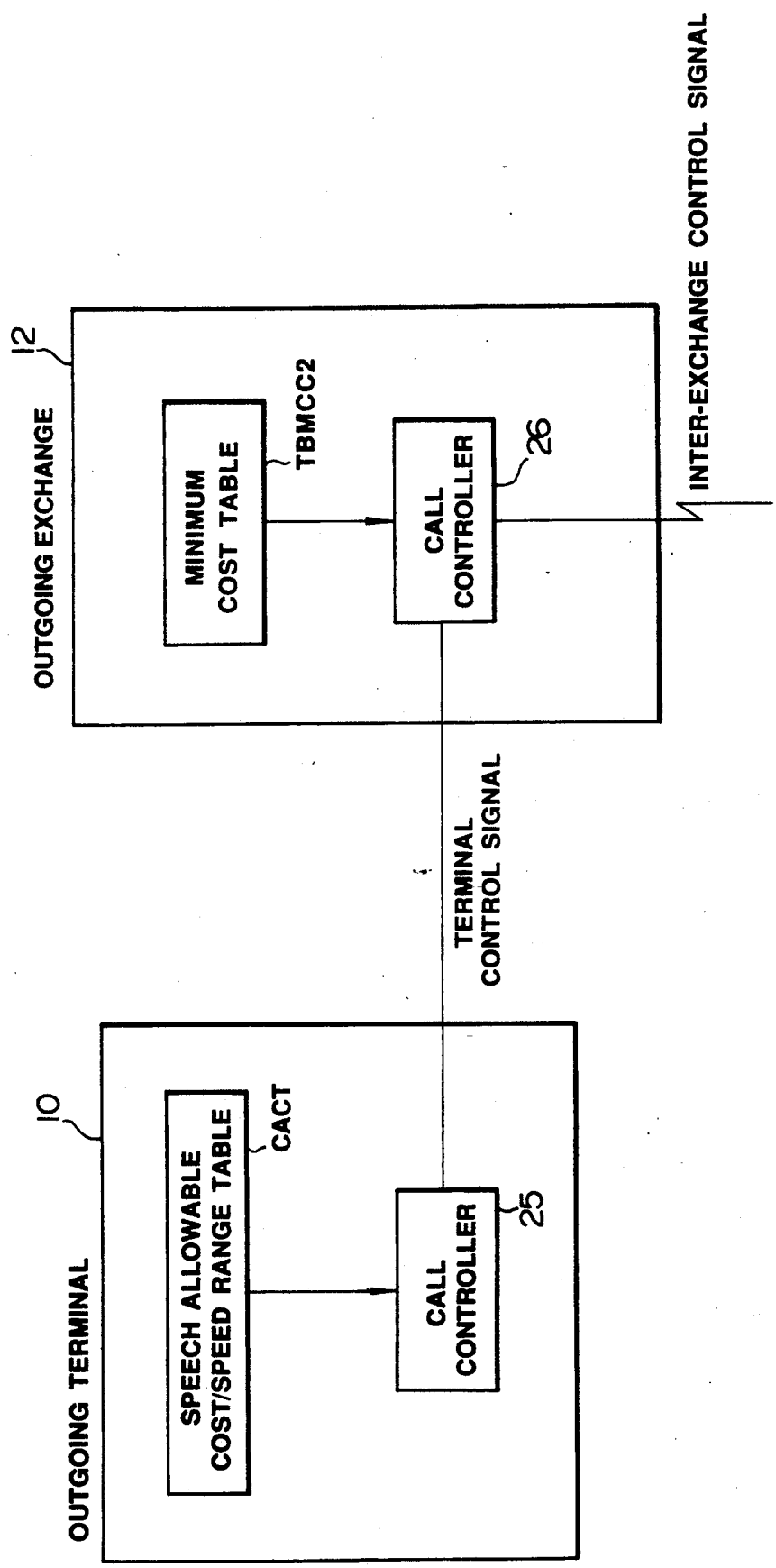
FIG. 17 shows details of interior arrangements of an outgoing terminal and an outgoing exchange.

The outgoing terminal 10 in the present embodiment, as shown by its interior arrangement in FIG. 17, includes a communication allowable cost/allowable speed range table (which will be referred to as the CATT, hereinafter) which prescribes allowable cost ranges and allowable speed ranges for different incoming terminals, and also includes a calling control part 25 which uses a terminal control signal to cause data in the minimum cost table TBMCC2 to be returned between the outgoing terminal 10 and the outgoing exchange 12 directly connected with the terminal 10. The outgoing exchange 12, on the other hand, includes such a minimum cost table TBMCC2 having minimum cost values and line numbers listed for different communication speeds as shown in FIG. 14, and also includes a calling control part 26 which returns to the outgoing terminal 10 the contents of the table TBMCC2 in response to a request from the outgoing terminal 10 and selects one of the line numbers corresponding to a request cost of the outgoing terminal 10.

Figures 18, 19:
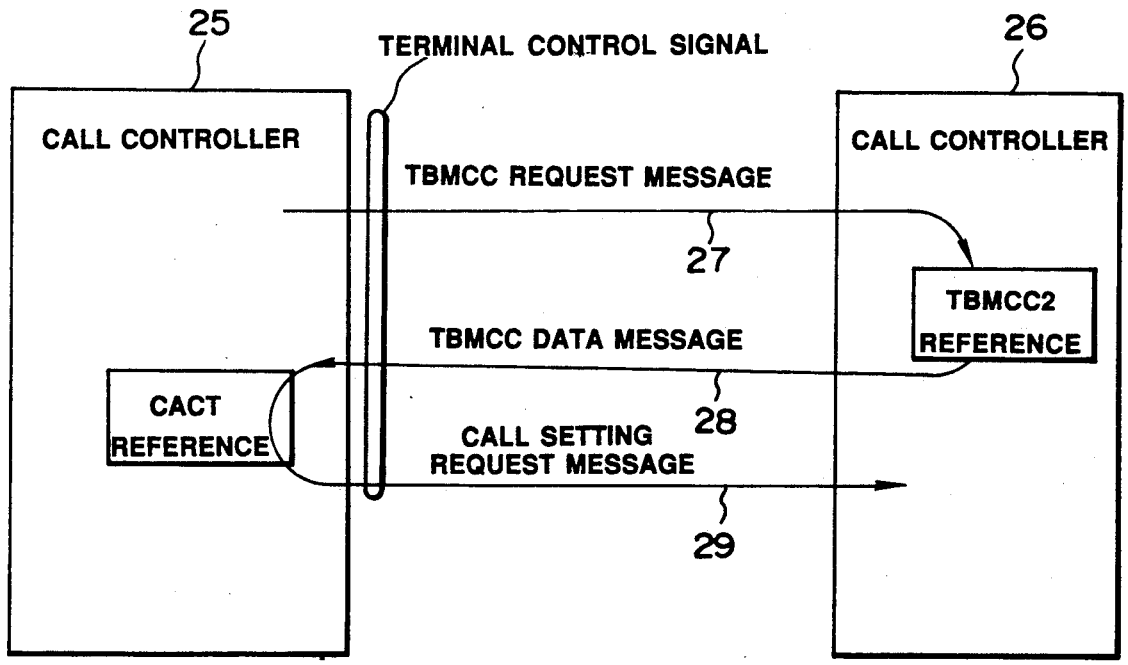
FIG. 18 shows contents of an allowable cost/allowable communication speed table used in FIG. 17.
FIG. 19 shows details of terminal control data used in FIG. 17.

FIG. 18 shows an example of contents of a table CACT having allowable cost ranges $C_{i0}$ to $C_{i1}$ in which communication between the outgoing terminal 10 and incoming terminals $M_i$ (i=1 to m) belonging to an exchange $N_j$ is allowable, having allowable speed ranges $T_{i0}$ to $T_{i1}$ in which speeds of the terminals $M_i$ are allowable, and having cost/speed priority flags which indicate whether the terminal $M_i$ preferentially handles the cost or speed, listed therein with respect to the incoming exchanges $N_j$ and the incoming terminals $M_i$ belonging thereto.

FIG. 19 shows details of the terminal control signals to be transferred between the outgoing terminal 10 and the outgoing exchange 12, in which the outgoing terminal 10 transmits a TBMCC request message 27 and a call setting request message 29 to the outgoing exchange 12, while the outgoing exchange 12 returns a TBMCC data message 28 to the outgoing terminal 10. These messages have the following meanings.

(1) TBMCC Request Message

Requests the supply of the minimum cost data of the incoming exchange $N_j$ corresponding to different request communication speeds in the TBMCC to the outgoing exchange 12, with the address (address in the exchange network) of the incoming exchange $N_j$ attached thereto as an additional data.

(2) TBMCC Data Message

Transmits to the outgoing terminal 10 the minimum cost data of the incoming exchange $N_j$ corresponding different request speeds in the TBMCC2, as a response to the TBMCC request message 27.

(3) Call Setting Request Message

Requests the setting of the communication route with the specified request speeds up to the incoming terminals $N_j$ with respect to the exchange network. This message is attached with the address of the incoming exchange $N_j$ within the exchange network, the address of the incoming terminal $M_i$ and the request communication speed data of the outgoing terminal 10.

Figure 20:
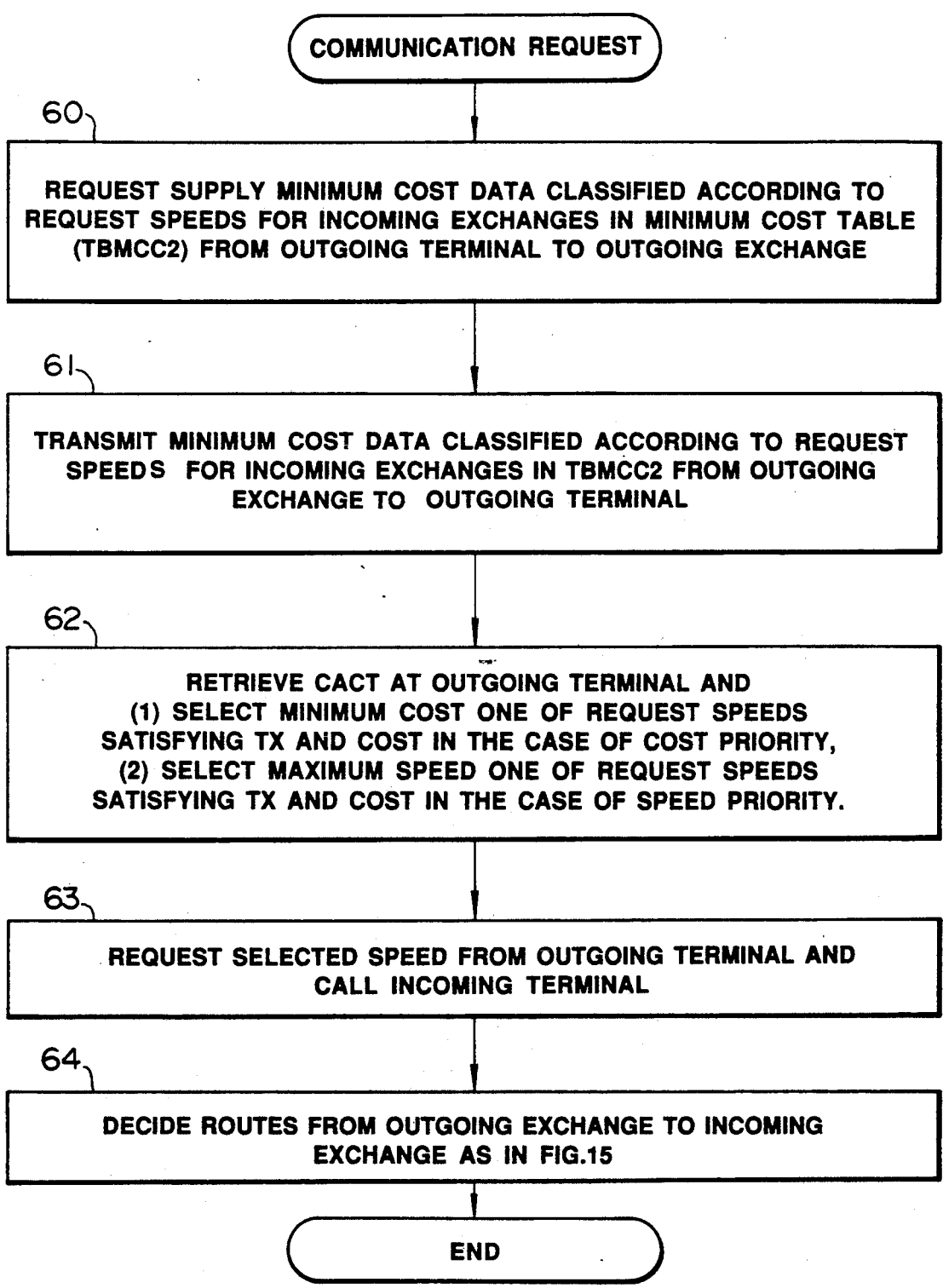
FIG. 20 is a flowchart for explaining the route decision procedure of the embodiment of FIG. 16.

FIG. 20 is a flowchart for explaining the route decision procedure in such an arrangement. The outgoing terminal 10, when a communication request occurs in the terminal 10, transmits the TBMCC request message 27 to the outgoing exchange 12 including the outgoing terminal 10 to request the return of the minimum cost data of the specified incoming exchange $N_j$ in the TBMCC2 corresponding to the different request communication speeds (step 60). The outgoing exchange 12, when receiving the TBMCC request message 27, extracts one of the minimum cost data in the TBMCC2 corresponding to the different request communication speeds on the basis of the address of the incoming exchange $N_j$ as the additional data and returns it to the outgoing terminal 10 as the TBMCC data message 28 (step 61). The outgoing terminal 10, when receiving the TBMCC data message 28, retrieves data previously set within the table CACT, and checks whether the COST/$t_x$ priority flag of the incoming terminal $M_i$ in the specified incoming exchange $N_j$ are set with the cost priority or with the communication speed priority. When the flag is set with the cost priority, the outgoing terminal 10 selects minimum one of the cost data at the request speed satisfying the allowable cost and speed ranges of the incoming terminal $M_i$ on the basis of the minimum cost data of the different request speeds in the received TBMCC data message. When the COST/$t_x$ priority flag is set with the communication speed priority, the outgoing terminal 10 selects maximum one of the communication speeds at the request speed satisfying the allowable cost and speed ranges of the incoming terminal $M_i$ (step 62). The outgoing terminal 10 transmits to the incoming terminal $M_i$ the call setting request message 29 attached with the thus selected request communication speed, the incoming exchange address and the incoming terminal address as the additional data (step 63). The route decision from the outgoing exchange 12 to the incoming exchange $N_j$ is executed in the same manner as in FIG. 15.

Figure 16:
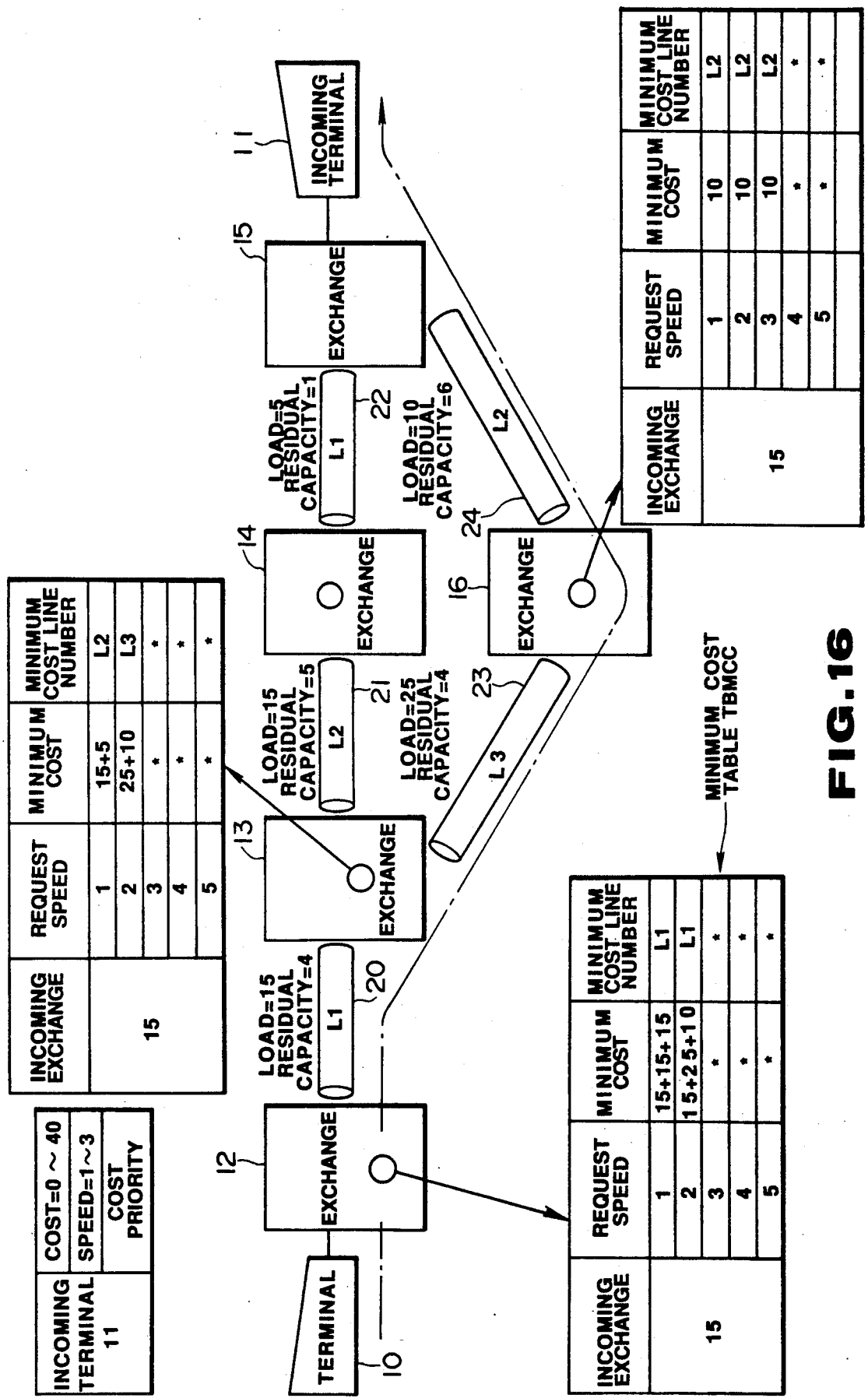
FIG. 16 is an arrangement of a system in accordance with another embodiment of the present invention.

Assume, for example, that "COST=0–40" as the allowable cost range, "$T_x$=1–3" as the allowable communication speed range and "cost priority" as the priority flag with respect to the incoming terminal 11 are set in the outgoing terminal 10, as shown in FIG. 16. Then, the route passing through the exchange 16 has a cost of "15+25+10=50" and the route passing through the exchange 14 has a cost of "15+15+5=35". As a result, the system selects the route passing through the exchange 14 and allowing "COST=40" and also selects the communication speed having a range "1". In this case, if the "speed priority" is set as the priority flag, then the system selects one of the routes satisfying the maximum communication speed range "3", that is, the route passing through the exchange 16. Accordingly, when the allowable cost range is not specified, communication is inevitably established through the route "cost=50" passing through the exchange 16; whereas, when the allowable cost range is specified, communication is established through the route "cost=35" passing through the exchange 14 so that the communication cost can be prevented from being increased and exceeding a preset level depending on the load condition of the exchanges up to the incoming exchange 11. In this case, when the allowable cost range is handled as a metering unit data, it is only required to previously specify the metering unit in the outgoing terminal, whereby cost control is advantageously facilitated.

Although the present embodiment has been arranged to select the route satisfying both the request cost of the outgoing terminal and the communication speed, the embodiment may be combined with such a method for selecting a route satisfying a request line capacity as shown in the embodiment of FIG. 4.

What is claimed is:

1. In a network including various communication terminals of multiple rates requiring immediate data communication and exchanges connected through lines, an exchange route decision system for deciding one of communication routes from an outgoing one of said exchanges connected to an outgoing one of said terminals to an incoming one of the exchanges connected to an incoming one of the communication terminals, each of said exchanges comprising:

memory means for dividing residual capacities of said lines into a plurality of residual-line-capacity classes each having a boundary value and for storing minimum cost line data corresponding to minimum cost ones of the communication routes from said outgoing exchange to said incoming exchange according to said residual-line-capacity classes;

control means for controllably setting separately the boundary value of each of the classes divided by said memory means into a first group of classes characterized by a decreasing boundary value and a second group of classes characterized by an increasing boundary value;

retrieval means for retrieving one of said minimum cost line data corresponding to the class satisfying a request capacity of the outgoing terminal; and decision means for deciding one of the communication routes on the basis of said minimum cost line data retrieved by said retrieval means.

2. An exchange route decision system as set forth in claim 1, wherein said memory means stores the minimum costs of said routes from said outgoing exchange to said incoming exchange as well as minimum cost line numbers corresponding to said minimum costs in association with said respective residual-line-capacity classes.

3. An exchange route decision system as set forth in claim 1, wherein said memory means stores said minimum cost line data associated with said residual-line-capacity classes.

4. An exchange route decision system as set forth in claim 1, wherein each of said route costs is an estimated value which is expressed in terms of a sum of loads corresponding to lines of the each route.

5. An exchange route decision system as set forth in claim 1, wherein each of said route costs is an estimated value which is defined as an equation $C_j = \Sigma(\alpha + \beta D_{Li})$, wherein j denotes a number representative of one of the routes, i denotes a number representative of one of the lines, $L_i$ denotes lines of said each route, $D_{Li}$ denotes distances between said lines, $\alpha$ denotes a processing load cost of a relay exchange, and $\beta$ denotes a cost coefficient relation to line distance.

6. An exchange route decision system as set forth in claim 1, wherein each of said exchanges further includes transmission means for transmitting to an adjacent exchange residual-line-capacity control minimum cost vectors including minimum cost data in association with said incoming exchange and said residual-line-capacity classes.

7. An exchange route decision system as set forth in claim 6, wherein said transmission means, where said residual line capacity class or minimum cost is changed, transmits to said adjacent exchange said residual-line-capacity control minimum vectors.

8. An exchange route decision system as set forth in claim 6, wherein said transmission means cyclically transmits to said adjacent exchange said residual-line-capacity control minimum cost vectors at a predetermined period.

9. An exchange route decision system as set forth in claim 6, wherein said transmission means includes vector generating means for generating residual-line-capacity control minimum cost vectors to be transmitted to a next adjacent exchange on the basis of said residual-line-capacity control minimum cost vectors received from said adjacent exchange.

10. An exchange route decision system as set forth in claim 9, wherein said vector generating means includes: table preparing means for preparing an every-line minimum cost table in which minimum costs are listed in association with said incoming exchange, residual-line-capacity classes and lines; table rewriting means for rewriting said minimum costs corresponding to said lines in said every-line minimum cost table on the basis of said received residual-line-capacity control minimum cost vectors; and means for retrieving the minimum costs classified according to the incoming exchange and residual-line-capacity classes from a rewritten every-line minimum cost table and for adding loads of lines up to the adjacent exchange to said retrieved minimum costs to thereby generate said residual-line-capacity control minimum cost vectors.

11. In a network including various sorts of communication terminals of multiple rates requiring immediate data communication and exchanges connected through lines, an exchange route decision system for deciding one of communication routes from outgoing one of said exchanges connected to outgoing one of said terminals to incoming one of the exchanges connected to incoming one of the terminals; each of said exchanges comprises:

memory means for dividing communication speeds of said lines into a plurality of communication speed classes and for storing minimum cost line data corresponding to minimum cost ones of the routes from said outgoing exchange to said incoming exchange according to said communication speed classes;

retrieval means for retrieving said minimum cost line data corresponding to the communication speed class satisfying a request communication speed of the outgoing terminal from contents stored in said memory means; and decision means for deciding one of the communication routes on the basis of said minimum cost line data retrieved by said retrieval means.

12. An exchange route decision system as set forth in claim 11, wherein said outgoing terminal includes means for setting a request communication speed range, a request cost range, and communication speed priority or cost priority; means for requesting supply of said minimum cost data classified according to said request communication speed to said outgoing exchange; means, in the case of said speed priority, for selecting maximum one of request communication speeds satisfying said request communication speed range and said request cost range, and in the case of said cost priority, for selecting minimum cost one of the request communication speeds satisfying the request communication speed range and the request cost range; and means for instructing the request communication speed selected by said selection means to the outgoing exchange.

13. An exchange route decision method in which tandem connection between outgoing and incoming terminals is attained through a plurality of exchanges and relay lines by selecting, at each of said exchanges, minimum cost one of routes between said outgoing and incoming terminals, said method comprising the steps of, at the each exchange,:

dividing residual line capacities of the relay lines except for their capacities being used, into a plurality of classes based on predetermined capacity units;

controlling minimum cost route data in association with said classes;

separately setting boundary values of each of said classes into a first group of classes characterized by a decreasing boundary value and a second group of classes characterized by an increasing boundary value;

selecting one of the routes corresponding to the class satisfying a request line capacity of the outgoing terminal; and performing the tandem connection between the outgoing and incoming terminals through said selected route.

14. An exchange route decision method as set forth in claim 13, wherein each of said route costs is an estimated value which is expressed in terms of a sum of loads corresponding to lines of the each route.

15. An exchange route decision method as set forth in claim 13, wherein each of said route costs is an estimated value which is defined as an equation $C_j = \Sigma(\alpha + \beta D_{Li})$, where j denotes a number representative of one of the routes, i denotes a number representative of one of the lines, $L_i$ denotes lines of said each route, $D_{Li}$ denotes distances between said lines, $\alpha$ denotes a processing load cost of a relay exchange, and $\beta$ denotes a cost coefficient relation to line distance.

16. An exchange route decision method as set forth in claim 13, further comprising the step of modifying said minimum cost route data classified according to said classes and sequentially transmitting them to the adjacent exchange when the residual line capacity class has been changed.

17. An exchange route decision method as set forth in claim 13, further comprising the step of modifying said minimum cost route data classified according to said classes and sequentially transmitting them to the adjacent exchange when the line load has been changed.

18. An exchange route decision method as set forth in claim 13, further comprising the step of cyclically modifying said minimum cost route data classified according to said classes and sequentially transmitting them to the adjacent exchange at a predetermined period.

19. An exchange route decision method in which tandem connection between outgoing and incoming terminals is attained through a plurality of exchanges and relay lines by selecting, at each of said exchanges, minimum cost one of routes between said outgoing and incoming terminals, said method comprising the steps of, at the each exchange,:

dividing communication speeds of said relay lines into a plurality of classes;

controlling minimum cost route data in association with said classes; and performing the tandem connection between the outgoing and incoming terminals through said selected route.

20. An exchange route decision method in which tandem connection between outgoing and incoming terminals is attained through a plurality of exchanges and relay lines by selecting, at each of said exchanges, minimum cost one of routes between said outgoing and incoming terminals, said method comprising the steps of, at the each exchange,:

dividing communication speeds of said relay lines into a plurality of classes;

controlling minimum cost route data in association with said classes;

selecting, when communication speed priority is set, maximum one of request communication speeds satisfying a request communication speed range and a request cost range and selecting, when cost priority is set, minimum cost one of the request communication speeds satisfying said request communication speed range and said request cost range;

selecting one of the routes corresponding to the class satisfying said request communication speed; and performing the tandem connection between the outgoing and incoming terminals through said selected route.

* * * * *